United States Patent Office 3,850,847
Patented Nov. 26, 1974

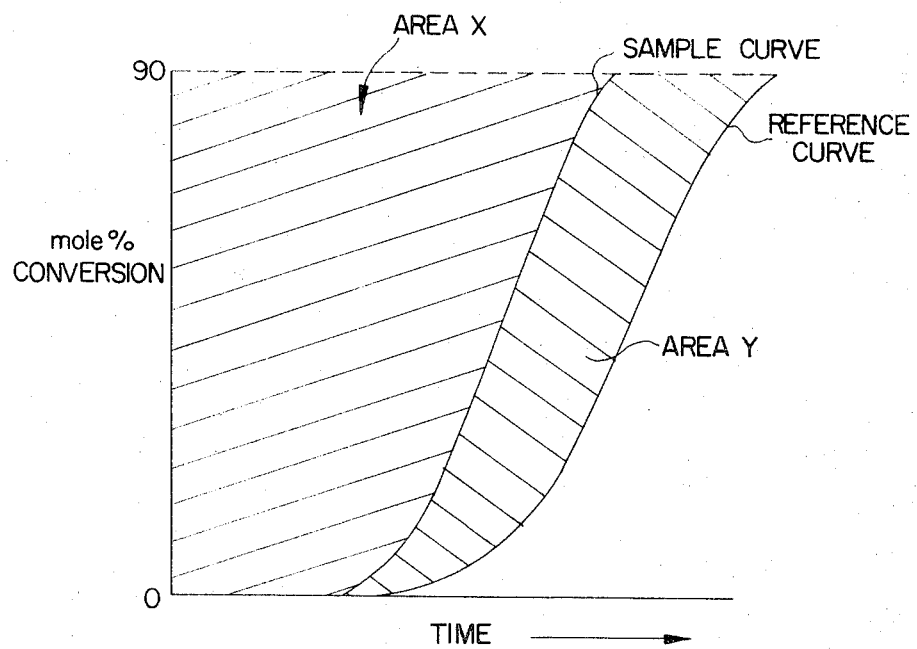

3,850,847
PROCESS FOR PREPARING ULTRA STABLE EXHAUST CATALYST OF IMPROVED ACTIVITY
James Richard Graham, Columbia, Michael V. Ernest, Baltimore, and James Michael Maselli, Columbia, Md., assignors to W. R. Grace & Co., New York, N.Y.
Filed Dec. 19, 1972, Ser. No. 316,647
Int. Cl. B01j 11/06
U.S. Cl. 252—462          2 Claims

ABSTRACT OF THE DISCLOSURE

A process is described for preparing a noble metal catalyst which is distended with high efficiency and stability due to the interaction of the noble metal with reduced cerium oxide present in the support or a soluble source of cerium added along with the noble metals during the application step.

BACKGROUND OF THE INVENTION

The problem of air pollution is not a new one. However, the problem has become increasingly serious in many cities in recent years. A substantial portion of the pollution is a result of compounds which are derived from unburned or partially burned hydrocarbons, found in the exhaust of internal combustion engines.

Several investigators have realized that the only practical way to treat the exhaust fumes to control hydrocarbon and carbon monoxide pollution is to oxidize the hydrocarbons to carbon dioxide and water, and to oxidize the carbon monoxide to carbon dioxide. It is also known that to lower the level of nitrogen oxides ($NO_x$) which are also present in the exhaust gases it is preferable to reduce the various oxides to free nitrogen. Thus, there is the problem of finding materials capable of not only catalyzing these reactions, but also having sufficient chemical and physical stability to withstand the extreme temperature environments which exist in any catalytic exhaust device.

A wide selection of oxidation catalyst has been produced in the past which vary both in chemical composition and physical structure. With respect to chemical composition the ability of a wide variety of metals and metal oxides, either alone or in combination, having the activity necessary to catalyze the complete oxidation of hydrocarbons and carbon monoxide has been noted.

To be sufficiently effective for the removal of hydrocarbons and carbon monoxide from exhaust gases and to meet the standards of maximum emissions currently set by the Environmental Protection Agency a catalyst must become operational within a very few seconds after engine start up and must maintain high activity throughout various modes of engine operation.

The problem of excessively high temperatures which are obtained when high concentrations of pollutants are being oxidized must also be solved in this system. It is not unusual for excursions in catalyst temperatures to reach 1800° F. or higher. Present catalytic systems cannot withstand prolonged exposure to these temperatures without significant thermal or thermochemical degradation of the catalyst leading to loss of activity, shrinkage, and the severe attrition which renders the catalytic device useless.

Particularly suitable supports for exhaust catalysts are the transition type aluminas. At low temperatures, the alumina is present as a gamma or any of the other transition forms. However, as the temperature increases these transition aluminas undergo a phase change to alpha alumina. This is undesirable because it results in a severe loss of surface area and physical strength. These changes in turn lessen the effectiveness of the catalyst because of shrinkage which causes lower activity, gas bypassing and loss of catalyst due to attrition.

The use of noble metals to catalyst the conversion of exhaust gases to innocuous entities is well known. In addition to the principle components of these catalyst several of the nobel metals have been used in small amounts to promote the activity of base metal systems.

U.S. Pat. 3,189,563, of Hauel, issued June 15, 1965, is typical of the patents relating to the use of noble metal catalysts in the conversion of automobile exhaust gases.

U.S. Pat. 3,455,843, to Briggs et al., issued July 15, 1969, is typical of base metal catalyst systems promoted with a noble metal.

Unpromoted base metal catalysts have been described in U.S. Pat. 3,322,491, by Barrett et al., issued May 30, 1967.

The methods for improving a high temperature resistance of catalyst supports are disclosed in copending applications Ser. No. 152,388, filed June 17, 1971, and an ultra stable exhaust catalyst is disclosed in U.S. Ser. No. 271,856, filed July 14, 1972.

BROAD STATEMENT OF THE INVENTION

We have found that noble metals distended on a suitable support such as any of the several aluminas, silica, silica-aluminas, spinels, zirconia, cordierite, etc., can be kept in a highly dispersed state—even after exposure to very high temperatures if the support contains 2 to about 90 percent by weight cerium oxide. The preparation method can be greatly simplified with improved stability and activity of the resulting catalyst if the solution of noble metals used for impregnating the support also contains a quantity of a salt of cerium and/or the cerium oxide containing support is subjected to reduction $N_2$—$H_2$ or any other suitable reducing agent. When the support is activated in a reducing environment or is impregnated with this combination, the catalyst can be activated at a much lower temperature than when the noble metal solution contains no cerium salt or when the reduction step is omitted.

DETAILED DESCRIPTION OF THE INVENTION

The first step of the preparation of our novel system is the selection of a suitable catalyst carrier. Examples of a suitable catalyst carriers include such materials as mullite, cordierite, birconia, titania, spinel, silica, silica-alumina, or alumina. The preferred carrier can be any of the many different forms of alumina. For purposes of simplicity, we will describe our catalyst system using alumina as the support although it is obvious that one of the previously noted carriers may be substituted for the alumina.

A unique and unexpected feature of this system is the retention of the catalytic activity and physical properties of the catalyst even after exposures to temperatures of 1800–2100 F. for up to 24 hours. The noble metal remains finely dispersed on the catalyst carrier due to the composition and method of preparation described below. The catalyst system may be in the form of granules, or distended or coated onto a honeycomb monolithic support. The alumina surface area should be between 10 and 300 square meters per gram and have sufficient porosity to accept between 0.1 to 1.0 ml. of solution per gram of solid. The alumina carrier is subsequently converted to a unique active and stabilized support by distending cerium oxide on its surface. Very broadly, the procedure comprises applying an aqueous solution of cerium nitrate, chloride, acetate, or any suitable salt on an alumina carrier. The impregnated alumina is then dried at 300° F. and further subjected to high temperature, 1800–2000° F. for 2–24 hours or heated under a $N_2$—$H_2$ mixture at 1000°–1600° F. to complete the preparation of the active and stabilized base. For optimum performance and stabilization against thermal damage the resulting support should contain from 2 to about 90% by weight distended cerium oxide and have a surface area between 5–300 square meters per gram. The cerium oxide, as applied to the alumina, is converted to the $CeO_2$ form of the oxide by the high temperature treatment (as confirmed by X-ray diffraction analysis) or the reduced oxide, $Ce_2O_3$, when the treatment includes $N_2$—$H_2$ atmospheres. X-ray diffraction data further show no substantial chemical interaction between the cerium oxide and the alumina carrier. Only two crystalline phases are present below 2000° F., $CeO_2$, and transition alumina when the calcination is carried out in air. Trace quantities of alpha alumina begin appearing above 2000° F. The cerium oxide crystallites distended on the alumina are very small as measured by X-ray line broadening and consequently exhibit high specific surface area.

After the above procedure, the support can either be granulated to be used in the form of pills, balls, extrudates, etc., or can be reduced to a micron size powder to coat honeycomb monolithic forms of auto exhaust catalysts.

The essential feature of our novel process resides in the second step of the process. U.S. Application Ser. No. 271,856 describes the ceria ($CeO_2$)-alumina-palladium composition of excellent activity and thermal stability. However, the preparation described therein requires two high temperature calcinations in order to bring about the desired physical integrity, shrink resistance, high activity, and thermal stability. These calcinations are conducted at temperatures of about 1800–1850° F. This double high temperature treatment is economically undesirable and inconvenient from a processing standpoint.

In the second step of our process, we incorporate a cerium salt solution with the solutions of the salts of the desired noble metals such as palladium, rhodium, ruthenium, and/or platinum, for example. Any of the soluble salts of these noble metals can be used in this step of the process. Examples of suitable salts include the nitrates, nitrites, chlorides, and the tetramine nitrates. The cerium salt can be present as a solution of the nitrate, chloride, acetate, etc. The preferred noble metal is palladium. A mixture of platinum and palladium is also very effective.

The noble metal can be present to the extent of 0.01 to 1 percent by weight based on the weight of the support in the granular form of the catalyst or from 0.05 to 5.0 based on the weight of the coating in the monolithic version. The coating constitutes about 2–50 percent by weight of the monolith. About 20–80 percent cerium oxide based on the coating weight is preferred.

When cerium is added to the solution used to impregnate the nodules or the monolith, the calcination temperature in the last step of the process can be reduced from 1800–2000° F. to about 1000–1250° F. This calcination is carried on for periods of 2–24 hours. A particularly satisfactory catalyst is obtained by calcination of cerium-palladium impregnated support at a temperature of about 1200° F. for a period of about 2–4 hours.

As mentioned previously, one of the outstanding properties of this system is the fact that the catalyst activity and palladium surface area are not effected by, and in some cases improve after, exposure to temperatures approaching 2100° F.

This ultra stability is related to the distended cerium oxide on the alumina. X-ray diffraction studies have shown that the cerium oxide is present on the alumina as $CeO_2$. When this ceria stabilized alumina is impregnated with aqueous solutions of palladium or platinum salts containing cerous ion and calcined, the result is a supported noble metal catalyst of very high noble metal dispersion. Without being bound thereby, we believe that the cerium salt acts as an in situ reducing agent for the palladium and platinum and that the $CeO_2$ formed during this reduction acts as a stable support for the noble metal. In the case in which the ceria-alumina is reduced prior to application of the Pd-Pt solutions the $Ce_2O_3$ species also act to reduce and fix the noble metals.

A Redox system set up between the $Ce_2O_3$—$CeO_2$ and PdO—Pd (PtO—Pt) keeps the Pd or Pt highly dispersed and offers a mechanism for the redispersion of larger crystallites of Pd and Pt. Upon heating $CeO_2$ to high temperatures some $Ce_2O_3$ can be formed. Alternately heat treating under $N_2$—$H_2$ atmospheres also produces $Ce_2O_3$. This $Ce_2O_3$ can reduce some PdO (PtO) to Pd (to Pt) and thereby regenerate $CeO_2$. We postulate that cyclic oxidation and reduction of Pd and Pt of this type has a tendency to reduce the crystallite size of noble metal particles.

The advantages of fine dispersions of the noble metal particles are well known. The more finely dispersed the metal is on the support the more of the noble metal is available for catalyzing the reactions involved in the conversion of the exhaust gases to innocuous entities.

The catalytic performance of the system was evaluated using two methods. One of the methods simulated an exhaust gas environment in a bench size apparatus. The other utilized procedure for chassis testing described in detail in the Federal Register of July 1970, as modified by the instructions in the Federal Register of July 1971.

The bench test is designed to simulate the exhaust gas composition and heat up conditions experienced by a catalyst during the initial part of the actual chassis dynamometer run. The test approximates the environment the catalyst will experience during the all-important "cold start" segment of the chassis test which accounts for a substantial portion of the total carbon monoxide emitted.

Monoliths for bench evaluation are a cylinder one inch in diameter by one inch long. Granular catalysts are approximately 3×4 mm. in size and fill 13 cc. of reactor volume. Total gas rate is regulated to achieve a gas hourly space velocity of approximately 38,000. The simulated exhaust gas contains 1700 p.p.m. carbon as hexane, 4.5 volume percent oxygen, 10.0 volume percent water, 6.5 volume percent carbon monoxide with the balance made up by nitrogen. The gas mixture is preheated so that the inlet gas temperature to the bed of catalyst is 600° F. As the hot gas passes through the room temperature catalyst, the bed begins to heat up in a manner similar to heat up in an actual catalytic device on an automobile. When the temperature in the bed becomes high enough, catalytic oxidation of the carbon monoxide and hydrocarbon in the stream commences and the temperature increases at an accelerated rate due to the heat of reaction. Catalyst performance is measured by determining an activity index. The CO activity indices that are reported in this invention are the time-conversion performances of sample catalysts relative to the time-conversion performances of a standard reference catalyst which has known vehicle performance. In effect, the index is a ratio of the respective areas that are generated by the sample and reference catalysts time-conversion data as illustrated diagrammatically in the Figure. Using the data shown in the figure, the activity index A.I. is calculated as follows:

$$A.I. = \frac{\text{Sample Area}}{\text{Reference Area}} = \frac{\text{Area }(X)}{\text{Area }(X+Y)} \quad 0 \leq A.I. \leq \infty$$

The activity index has limits 0 and ∞; indices approaching zero indicate higher degrees of activity whereas indices approaching ∞ indicate catalysts of lesser degrees of activity. Catalysts which generate areas smaller than the reference have activity indices less than one and are more active than the reference. Catalysts generating areas greater than the reference give indices of more than one and are less active.

Broadly speaking, the chassis evaluation is designed to determine the hydrocarbon, carbon monoxide and oxides of nitrogen in gas emissions from an automobile while simulating the average trip in an urban area of 7½ miles from a cold start. The test consists of engine start up and vehicle operation on a chassis dynamometer through a specified driving schedule consisting of a total of 1371 seconds. A proportionate part of the diluted gas emissions is collected continuously for a subsequent analysis using a constant volume sampler.

The dynamometer run consists of two tests, a cold start test after a minimum of 12 hours soak, and a hot start test with a ten-minute soak between the two tests. Engine start up and operation over a driving schedule and engine shut down constitutes the complete cold start test. Engine start up and operation over the first 505 seconds of the driving schedule completes the hot start test.

The engine emissions are diluted with air to a constant volume and a portion sampled in each test. Composite samples are collected in bags and analyzed for hydrocarbons, carbon monoxide, carbon dioxide, and oxides of nitrogen. Parallel samples of diluted air are similarly analyzed for hydrocarbons, carbon monoxides, and oxides of nitrogen. The gas samples are analyzed for hydrocarbons by a flame ionization detector and carbon monoxide and carbon dioxide by nondispersive infrared analysis. Nitrogen oxides are determined by nondispersive infrared and ultraviolet analysis. The gasoline used in this test is 100 octane gasoline containing less than 0.5 grams of organic lead per gallon.

Catalysts shrinkage is determined by measuring the decrease in bulk volume of the granules after exposure to a specified temperature for a given length of time.

A rapid method for determining the surface area of palladium was developed using a hydrogen adsorption-desorption technique. The method described below makes partial use of the hydrogen chemisorption technique reported in the literature by C. E. Hunt (J. of Catalysis 23, 93 (1971)) and the phenomenon reported by L. J. Gillespie and F. P. Hall (J. Chem. Soc. 48, 1207 (1926)) that hydrogen shows very little solubility in palladium at room temperature (21° C.) if the pressure of the hydrogen is kept below about 15 mm. Hg.

The apparatus used for the chemisorption measurements was a PerkinElmer—Shell Sorptometer. A single carrier gas of 2 volumes percent $H_2$ in $N_2$ (or Ar) was used for initially reducing the sample, for adsorption of $H_2$ at 21° C. and as the purge gas for carrying the desorbed hydrogen to a chromatographic type TC detector. The experimental procedure consisted of (1) reducing 0.05 to 0.5 g. of catalyst sample held in a U-tube with the carrier gas (2% $H_2$ in $N_2$) at 430° C., using a molten lead bath for 15 minutes (2) removing the sample from the lead bath and allowing it to cool to room temperature (3) allowing the $H_2$ from the carrier gas stream to adsorb on the supported palladium catalyst for 5 minutes (4) rapidly heating the catalyst to 420° C., using the molten lead bath, to desorb chemically bonded hydrogen and (5) measuring the amount of hydrogen desorbed from the peak area recorded by the chromatographic-type detector.

From the hydrogen peak area the amount of hydrogen chemisorbed in terms of micromoles $H_2$/gram of noble metal is found using the following equation:

$$\mu \text{ moles } H_2/g. \text{ noble metal} = U = \frac{Pa}{Ta}$$

$$\cdot \left[\frac{273}{760}\right] \left[\frac{10^{-6}}{22414}\right] \frac{CCH_2}{\text{Sample wt.} \times \text{fraction noble metal}}$$

where Pa and Ta are pressure and temperature at detector $CCH_2$=GC factor $\times$ attenuation $\times$ integrator counts.

Assuming one atom of hydrogen chemisorbs on one exposed metal atom and that the area of a single Pd atom is 8.0 A. the specific surface area, S.A., expressed in m.²/gram of noble metal can be calculated as follows:

S.A. (m.²/g. Pd (Pt) $= U \times 8.0$ A.²

$\times 10^{-20}$ m.²/A.² $\times 6.023 \times 10^{23} \times 10^{-6}$ $= U \times 4.818 \times 10^{-2}$ Our invention is further illustrated by the following nonlimiting examples.

Example 1

This example illustrates the case wherein the catalyst preparation was carried out with a solution containing both palladium and cerium salts.

A total of 4.5 kilograms of alumina extrudates approximately 3×4 millimeters in size and having a surface area of about 250 square meters per gram and water adsorption of approximately 1.0 ml. per gram were impregnated to incipient wetness with 4500 ml. of an aqueous solution of cerous nitrate, containing an equivalent of 65 milligrams of $Ce_2O_3$ per ml. of solution. The saturated extrudates were dried at 300° F. for 6 hours and calcined at about 1850° F. for 4 hours.

A 100 gram portion of these extrudates which contained 6.10 percent cerium oxide calculated as $Ce_2O_3$ was transferred to an appropriate vessel. A solution of palladium tetrammine dinitrate solution was prepared to contain 40.8 milligrams of palladium in 75 ml. of solution. Cerous nitrate solution was prepared to contain 2 grams of cerium oxide calculated as $Ce_2O_3$. The extrudates were treated with this solution by heating the extrudates to a temperature of 250–275° F., before the mixed palladium salt solution was added. After treatment the catalyst extrudates were activated by heating to 1200° F. for 2 hours. The nominal composition of this catalyst was as follows:

92.0% $Al_2O_3$, 8.0% $Ce_2O_3$, and 0.04% Pd.

The catalyst was evaluated by comparison with a standard catalyst that did not contain the cerium salt along with the palladium prepared by a double calcination technique discussed earlier.

The results are shown in Table I below:

TABLE I

| | Fresh activity | Activity after 24 hours at— | | Percent shrinkage 24 hours at— | |
|---|---|---|---|---|---|
| | | 1,800° F. | 1,900° F. | 1,800° F. | 1,900° F. |
| Catalyst of this example | 0.591 | 0.623 | 0.641 | 3 | 6 |
| Standard catalyst | 0.891 | 0.731 | ¹ 0.689 | 0 | ¹ 3 |

¹ After 14 hours.

Example 2

The technique described in Example 1 above was used to prepare another catalyst.

The support which contained 6.10 percent cerium oxide calculated as $Ce_2O_3$ was treated with a solution containing palladium nitrate and cerous nitrate. The nominal composition of the catalyst was 93.50 percent alumina, 6.50 percent cerium oxide (as $Ce_2O_3$) and 0.04 percent palladium. CO conversion and shrinkage were compared to a standard catalyst prepared using the double high temperature calcination procedure. The data collected are set out in Table II below.

TABLE II

|  | Fresh activity | Activity after 24 hours at— | | Percent shrinkage 24 hours at— | |
| --- | --- | --- | --- | --- | --- |
|  |  | 1,800° F. | 1,900° F. | 1,800° F. | 1,900° F. |
| Catalyst of this example | 0.689 | 0.548 | 0.595 | 2 | 3 |
| Standard catalyst | 0.891 | 0.731 | [1] 0.689 | 0 | [1] 3 |

[1] After 14 hours.

Example 3

In this example the same technique of Example 1 was used to prepare catalysts containing palladium-ruthenium, and palladium-platinum. The cerium oxide modified alumina extrudates were treated with a solution containing the noble metals and cerous nitrate. After preparation the catalysts were activated by heating at 1200° F. for 2 hours. The catalysts of this example had the following nominal compositions:

93.45 percent _____ alumina.
6.50 percent _____ cerium oxide (as $Ce_2O_3$).
0.04 percent _____ palladium.
and either 0.005% ruthenium, or 0.005% of platinum.

Example 4

This example illustrates the improved stability by the addition of $Ce_2O_3$ as a soluble salt along wtih the noble metal solutions.

A monolith, 1 inch in diameter by 1 inch long was coated with a slip of alumina containing 6% cerium oxide as $Ce_2O_3$. A sufficient quantity of the slip was applied to give an 8.4% by weight coating on the monolith. The coated monolith was heated at 1000° F. for 2 hours. A solution was prepared to contain 20.9 milligrams of palladium by dissolving palladium nitrate in water. A sufficient quantity of cerous nitrate solution was prepared to contain 0.85 grams of cerium oxide calculated as $Ce_2O_3$. The mixed solution was adjusted to a pH of 6 using concentrated ammonium hydroxide. This solution was used to impregnate the coated monolith. The impregnated monolith was vacuum dried at 175° F. for 16 hours, and then activated by heating to 1200° F. for 3 hours. The nominal composition of the monolith was 0.25% palladium and 9.58% ceria, the balance being monolith.

The improved activity and stability of the monolith was demonstrated in a run in which two monoliths having the same composition were prepared using the same techniques except that one of the monoliths was impregnated with a solution that did not contain the cerium. The data collected in these runs are in Table III below:

TABLE III

|  | Fresh activity | Activity after calcination 20 hours at 1,800° F. |
| --- | --- | --- |
| Catalyst of this example | 0.547 | 1.187 |
| Catalyst without cerium salt in the impregnating solution | 0.740 | 1.526 |

Example 5

The degree of dispersion of palladium metal on a cerium oxide containing alumina was determined by hydrogen chemisorption in a series of samples in which the ceria was present as $Ce_2O_3$ and $CeO_2$. The samples were prepared as follows: 500 g. of gamma alumina, which had already been subjected to fluid energy milling in order to reduce the average particle size to about 1–3 microns was impregnated with a sufficient quantity cerous nitrate solution to give 20 weight percent $CeO_2$ on the alumina. After drying at 250° F., the material was divided into two equal portions.

Two hundred and fifty grams of the above cerium nitrate impregnated alumina was calcined in the absence of oxygen (under a flow of nitrogen containing 2% hydrogen) at 1400° F. for 3 hours. The cerium oxide on the resulting light grey powder was judged to be present mainly as $Ce_2O_3$. When a solution of palladium nitrate, Pd $(NO_3)_2$, was added to this powder, considerable heat was evolved and rapid decomposition of the $Pd(NO_3)_2$ occured. The resulting palladium-cerium oxide-alumina was calcined at 1000° F. and then at 1800° F. in order to evaluate the thermal stability of the palladium.

The remaining 250 g. of cerium nitrate impregnated alumina was calcined at 1400° F. for 3 hours in air. The resulting powder was light yellow in color and the cerium oxide was judged to be present on the alumina as $CeO_2$. After $Pd(NO_3)_2$ was added to this material in the manner described above, the powder was dried and calcined at 1000° F. and at 1800° F. Palladium surface area measurements were run on each of the calcined samples. The surface area of the palladium in square meters per gram of palladium and the degree of dispersion of the palladium (i.e., the ratio of exposed palladium atoms to total number of palladium atoms) were calculated from the number of micromoles of hydrogen chemisorbed per gram of catalyst. This data is set out in Table IV.

TABLE IV

| Pd level | Calcined 3 hrs. at 1,000° F. | | | Calcined 1 hr. at 1,800° F. | | |
| --- | --- | --- | --- | --- | --- | --- |
|  | $\mu$ Moles $H_2$/g. cat. | Degree of dispersion | Pd S.A., m.²/g. Pd | $\mu$ Moles $H_2$/g. cat. | Degree of dispersion | Pd S.A., m.²/g. Pd |
| 0.5% Pd on 20% $Ce_2O_3Al_2O_3$ of this invention | 36.2 | .77 | 349 | 15.5 | .33 | 149 |
| 2.0% Pd on 20% $Ce_2O_3Al_2O_3$ of this invention | 69.4 | .37 | 167 | 22.6 | .12 | 54 |
| 0.5% Pd on 20% $CeO_2Al_2O_3$ calcined in air (control) | 15.0 | .32 | 145 | 10.9 | .23 | 105 |
| 2.0% Pd on 20% $CeO_2Al_2O_3$ calcined in air (control) | 25.0 | .13 | 60 | 12.1 | .06 | 29 |

It is apparent from these data that the palladium supported on the cerium oxide-alumina of this invention (wherein the cerium oxide is initially present as $Ce_2O_3$) is significantly more highly dispersed at low and very high calcination temperatures than the same level of palladium on alumina wherein the ceria is present as $CeO_2$.

Example 6

A platinum catalyst was prepared in the same manner as the palladium catalysts described in Example 5. Platinum tetraamine dinitrate, $Pt(NH_3)_4(NO_3)_2$, was used as the platinum source for these preparations. One catalyst was prepared to contain 2 percent platinum supported on cerous nitrate impregnated alumina which had been calcined in the absence of oxygen so that the cerium was present as $Ce_2O_3$. Another catalyst was prepared for comparison purposes in exactly the same manner except that the cerous nitrate impregnated alumina was calcined in air so that the cerium was present as $CeO_2$. The degree of dispersion of the platinum was measured using the hydrogen chemisorption technique. The data collected for these catalysts are set out in Table V.

TABLE V

| Pt level | Calcined 3 hrs. at 1,000° F. | | | Calcined 1 hr. at 1,800° F. | | |
|---|---|---|---|---|---|---|
| | μ Moles $H_2$/g. cat. | Degree of dispersion | Pt S.A., m.²/g. Pt | μ Moles $H_2$/g. cat. | Degree of dispersion | Pt S.A., m.²/g. Pt |
| 2.0% Pt on 20% $Ce_2O_3Al_2O_3$ of this invention | 58.0 | .31 | 140 | 18.9 | .10 | 46 |
| 2.0% Pt on 20% $CeO_2Al_2O_3$ calcined in air (Control) | 30.8 | .16 | 74 | 10.6 | .06 | 26 |

Example 7

In this example, a 40 gram portion of a ceria-alumina containing 20% ceria, as $CeO_2$, that had been previously calcined in air for 3 hours at 1850° F. was placed in a tube furnace and calcined under an atmosphere of 98% nitrogen and 2% hydrogen for 8 hours at a maximum temperature of 1600° F. After cooling, under the same atmosphere to room temperature, the sample was observed to have changed in color from light yellow to light grey. The addition of a $Pd^{+2}$ and $Pt^{+2}$ salt solutions to this material resulted in catalysts having high metal dispersions. High metal dispersions are directly related to high activity. The comparative data is set out in Table VI.

TABLE VI

| Noble Metal level | Calcined 3 hrs. at 1,000° F. | | | Calcined 1 hr. at 1,800° F. | | |
|---|---|---|---|---|---|---|
| | μ Moles $H_2$/g. cat. | Degree of dispersion | S.A., m.²/g. Metal | μ Moles $H_2$/g. cat. | Degree of dispersion | S.A., m.²/g. Metal |
| 2.0% Pt of 20% $Ce_2O_3Al_2O_3$ of this example | 48.0 | .26 | 116 | 16.9 | .09 | 41 |
| 2.0% Pd on 20% $Ce_2O_3Al_2O_3$ of this example | 47.6 | .25 | 115 | 20.5 | .11 | 49 |

What is claimed is:

1. A process for preparing an ultra-stable catalyst for the conversion of the noxious components of exhaust gases to innocuous entities consisting essentially of:
   (a) impregnating a support selected from the group consisting of alumina, mullite, silica, cordierite, and silica-alumina of sufficient surface area with a solution of a soluble salt of cerium which upon calcination provides cerium oxide on the support,
   (b) calcining the impregnated support in air by heating to a temperature of about 1000° to 2000° F. to convert the cerium to oxide form,
   (c) contacting the impregnated support with a sufficient quantity of a solution of a salt of a noble metal selected from the group consisting of platinum, palladium and mixtures thereof, and a soluble cerium salt to impart a noble metal content of 0.01 to 5 percent and a final cerium oxide content of 2 to 90 percent with respect to the support,
   (d) calcining to about 900° to 1200° F. for about 2–6 hours, and
   (e) recovering the catalyst product.

2. A process for preparing an ultra stable auto exhaust conversion catalyst consisting essentially of:
   (a) preparing a slip of alumina containing a cerium salt which reacts to form cerium oxide upon calcination,
   (b) coating an inert monolithic support with said slip,
   (c) drying and calcining in air the coated monolith at a temperature of about 900° to 1200° F.,
   (d) impregnating the coated monolith with a sufficient quantity of a solution of a salt of a noble metal selected from the group consisting of chloride, nitrate, acetate, and tetraamine nitrate, and a soluble cerium salt selected from the group consisting of chloride, nitrate, and sulfate to impart a noble metal content of 0.5 to 5 percent and a final cerium oxide content of 20 to 80 percent with respect to the coating,
   (e) drying and calcining at a temperature of about 900° to 1200° F., and
   (f) recovering the monolithic catalyst.

References Cited

UNITED STATES PATENTS

| | | |
|---|---|---|
| 2,030,283 | 2/1936 | De Rewal _____ 252—462 X |
| 3,331,787 | 7/1967 | Keith et al. _____ 252—477 R X |
| 3,470,105 | 9/1969 | Briggs et al. _____ 252—455 R |
| 3,679,773 | 7/1972 | Kouach et al. _____ 252—460 X |
| 3,700,745 | 10/1972 | Kouach et al. _____ 252—462 X |
| 3,714,071 | 1/1973 | Michalko _____ 252—462 X |

PATRICK P. GARVIN, Primary Examiner

A. H. METZ, Assistant Examiner

U.S. Cl. X. R.

252—455 R, 460, 466 PT, 477 R; 423—214